Dec. 8, 1970    O. J. TYSVER ET AL    3,546,655
ROTARY ELECTRICAL JOINT
Filed Jan. 15, 1969                    5 Sheets-Sheet 1

INVENTORS
OLIVER J. TYSVER,
OLIVER C. TATE &
RICHARD E. PRENDERGAST
BY
ATTORNEYS

Dec. 8, 1970  O. J. TYSVER ET AL  3,546,655
ROTARY ELECTRICAL JOINT

Filed Jan. 15, 1969  5 Sheets-Sheet 2

FIG.4

INVENTORS
OLIVER J. TYSVER,
OLIVER C. TATE &
RICHARD E. PRENDERGAST

BY *Dilien, Brown, Ramik & Holt*

ATTORNEYS

Dec. 8, 1970  O. J. TYSVER ET AL  3,546,655
ROTARY ELECTRICAL JOINT

Filed Jan. 15, 1969  5 Sheets-Sheet 4

INVENTORS
OLIVER J. TYSVER,
OLIVER C. TATE &
RICHARD E. PRENDERGAST

BY Diller Brown Ramik +ba

ATTORNEYS

FIG. 8

INVENTORS
OLIVER J. TYSVER,
OLIVER C. TATE &
RICHARD E. PRENDERGAST

ATTORNEYS

United States Patent Office 3,546,655
Patented Dec. 8, 1970

1

3,546,655
ROTARY ELECTRICAL JOINT
Oliver J. Tysver, Chicago Heights, Oliver C. Tate, Westmont, and Richard E. Prendergast, Western Springs, Ill., assignors to Continental Can Company, New York, N.Y., a corporation of New York
Filed Jan. 15, 1969, Ser. No. 791,455
Int. Cl. H01t 39/00
U.S. Cl. 339—8
36 Claims

ABSTRACT OF THE DISCLOSURE

This disclosure relates to a rotary electrical joint for coupling a fixed conductor to a rotatable shaft. The joint is particularly adapted to transmit high currents and is of a construction to compensate for both misalignment of the rotatable member with the fixed conductor and any wobble which may occur during the rotation of the rotatable member.

This invention relates in general to new and useful improvements in rotary electrical joints, and more particularly electrical joints for transmitting high currents between a stationary conductor and a rotating conductor.

Although there have been recently developed suitable rotary electrical joints capable of transferring high currents with the joints being relatively small and having a practical life, such joints have not performed satisfactory when there is any eccentricity in the mounting of the components thereof or any rocking of the rotatable member. In view of the fact that it is virtually impossible to obtain complete alignment in production rate assemblies, there is substantially always a certain eccentricity in the several components. In addition, when a shaft or other rotatable member is under differential loading, there is almost always a certain degree of rocking of the shaft. Therefore, the previously developed and normally satisfactory rotary electrical joints have not proven to be entirely satisfactory. It is, therefore, the primary object of this invention to provide a novel rotary electrical joint which is of a construction to automatically compensate for both eccentricity in the mounting thereof and the rocking of the associated rotatable member.

In accordance with this invention, the rotary electrical joint compensates for eccentricity in the mounting of the components thereof by forming the joint of two conductor units with the two conductor units being in face-to-face contact along a plane disposed substantially normal to the axis of rotation of the rotatable member and with the conductor units having sliding contact in the plane.

Another feature of the rotary electrical joint is the formation of one of the conductor units to include first and second conductor members having slidable contacting concavo-convex surfaces for compensating for wobble of the rotatable member.

Basically, the rotary electrical joint of this disclosure includes first and second conductor units with one of the conductor units being of a two piece construction and being formed of first and second conductor members having slidable contacting concavo-convex surfaces with one of the two conductor members being fixed to either a support or a rotating member and the other of the two conductor members being disposed in floating relation and engaged with the other of the conductor units, and the other of the conductor units including a plurality of brush segments which are mounted on a suitable post or shaft like portion for both axial and rocking movement whereby the brush segments are in constant face-to-face contact with the floating conductor member at all times irrespective of either the eccentricity or the wobble of the two conductor units.

A further object of this invention is to provide a rotary electrical joint of a basic construction which is sufficiently small to be mounted in a horn for can bodies while capable of transmitting the necessary electrical energy to effect the welding of seams of can bodies, the rotary electrical joint forming part of an internal roller electrode. Another feature of the same rotary electrical joint is the adaptability thereof to the mounting of the combination support and conductor of an external roller electrode on a pivot shaft and the mounting of the rotary shaft of the external roller electrode within the combination support and conductor. A still further available use of a rotary electrical joint is in connection with an electrode which is mounted for both rotary and rocking movement, the electrode being rockable about a predetermined center in order to assure pressure contact thereof with a workpiece.

With the above and other objects in view that will hereinafter appear, the nature of the invention will be more clearly understood by reference to the following detailed description, the appended claims and the several views illustrated in the accompanying drawings.

Figure 2:
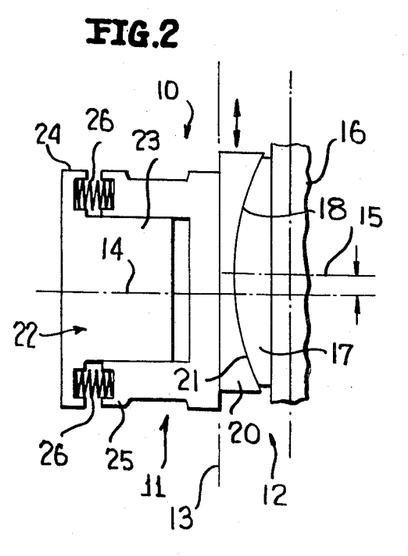
FIG. 2 is a schematic view showing generally the details of a rotary electrical joint formed in accordance with this invention wherein there is the desired contact between the two relatively movable halves of the electrical joint notwithstanding eccentricity in the mounting of the two halves.

Referring now to the drawings in detail, reference is now made to the schematic showing of FIG. 2 of a typical rotary electrical joint formed in accordance with this invention, the joint being identified by the numeral 10. The joint 10 includes a conductor unit 11 and a conductor unit 12 with the two conductor units being disposed in face-to-face contact along a plane 13. It is to be noted that the conductor unit 11 has an axis 14 which is illustrated as being parallel to but eccentric to an axis 15 of the conductor unit 12. As a result, the conductor units 11 and 12 have sliding contact in the plane 13.

The conductor unit 12 is illustrated as being carried by a member 16 and including a conductor member 17 having a convex face 18. The conductor unit 12 also includes a conductor member 20 having a concave face 21 which corresponds to the convex face 18 and which is in mating contact therewith. At this time it is pointed out that the faces 18 and 21 may be reversed on the conductor members 17 and 20 if desired.

The conductor unit 11 includes basically a holder 22 having a cylindrical portion 23 and a flange portion 24. The cylindrical portion 23 has mounted thereon a plurality of brush segments 25 which are preferably resiliently clamped about the exterior of the cylindrical portion 23 in any desired manner.

It is to be noted that the brush segments 25 are in face-to-face contact with the conductor member 20 and that the conductor member 20 is floatingly supported between the brush segments and the conductor member 17. In order to maintain the individual brush segments 25 in pressure contact with the conductor member 20, resilient elements in the form of springs 26 extend between the flange portion 24 and the brush segments 25, there being at least one spring 26 for each brush segment 25.

Figure 3:
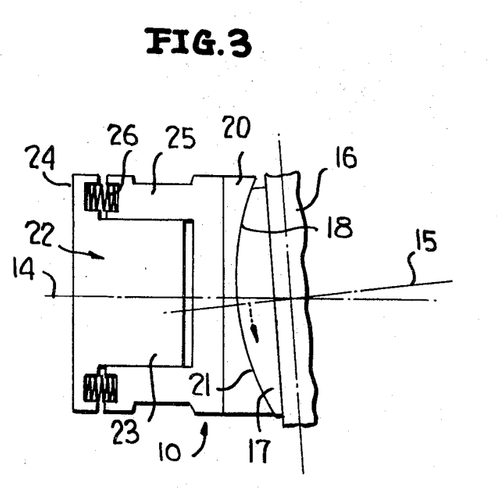
FIG. 3 is a schematic view similar to FIG. 2 and shows the manner in which the components of the rotary electrical joint will compensate for wobble or rocking movement of an associated rotatable member.

Reference is now made to the schematic showing of FIG. 3 wherein the member 16 is illustrated in a rocked or wobbled position and the axis 15 is no longer parallel to the axis 14. The conductor member 20 has remained in face-to-face engagement with the brush segments 25 while the conductor member 17 has rotated relative to the conductor member 20. However, the surfaces 18 and 21 of the conductor members 17 and 20 remain in face-to-face contact and capable of transmitting the required electrical energy.

It is also pointed out at this time that if the conductor member 20 should tilt slightly with respect to the axis 14, it will not necessarily move out of face-to-face contact with the brush segments 25 inasmuch as the brush segments 25 are individually longitudinally adjustable on the holder 22 and slight rocking of the individual brush segments 25 may occur due to the resilient mounting thereof on the holder 22.

Figure 1:
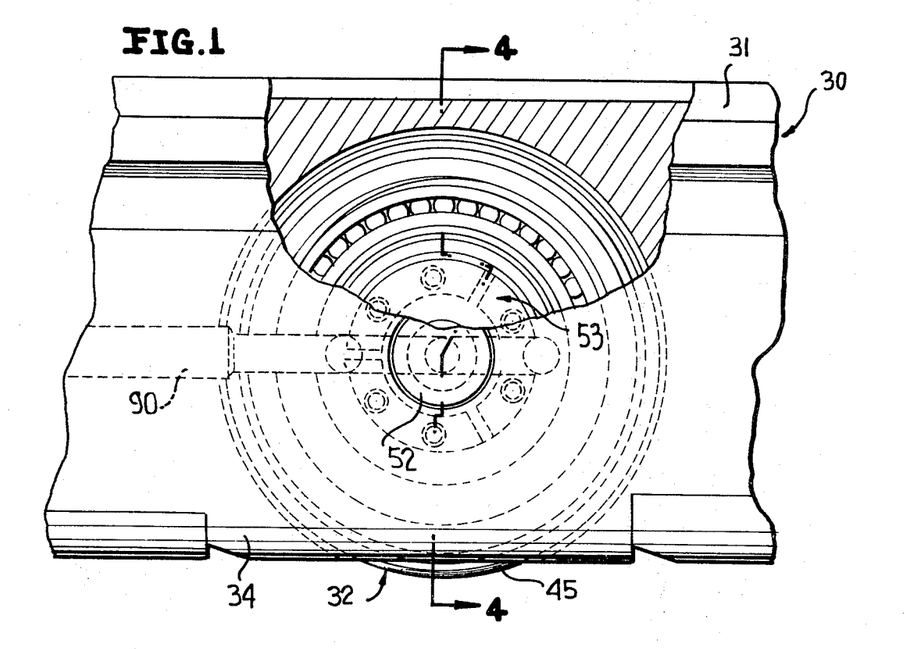
FIG. 1 is a fragmentary side elevational view of a welding horn with parts broken away and shown in section to illustrate the details of an internal roller electrode carried by the welding horn.
Figure 4:
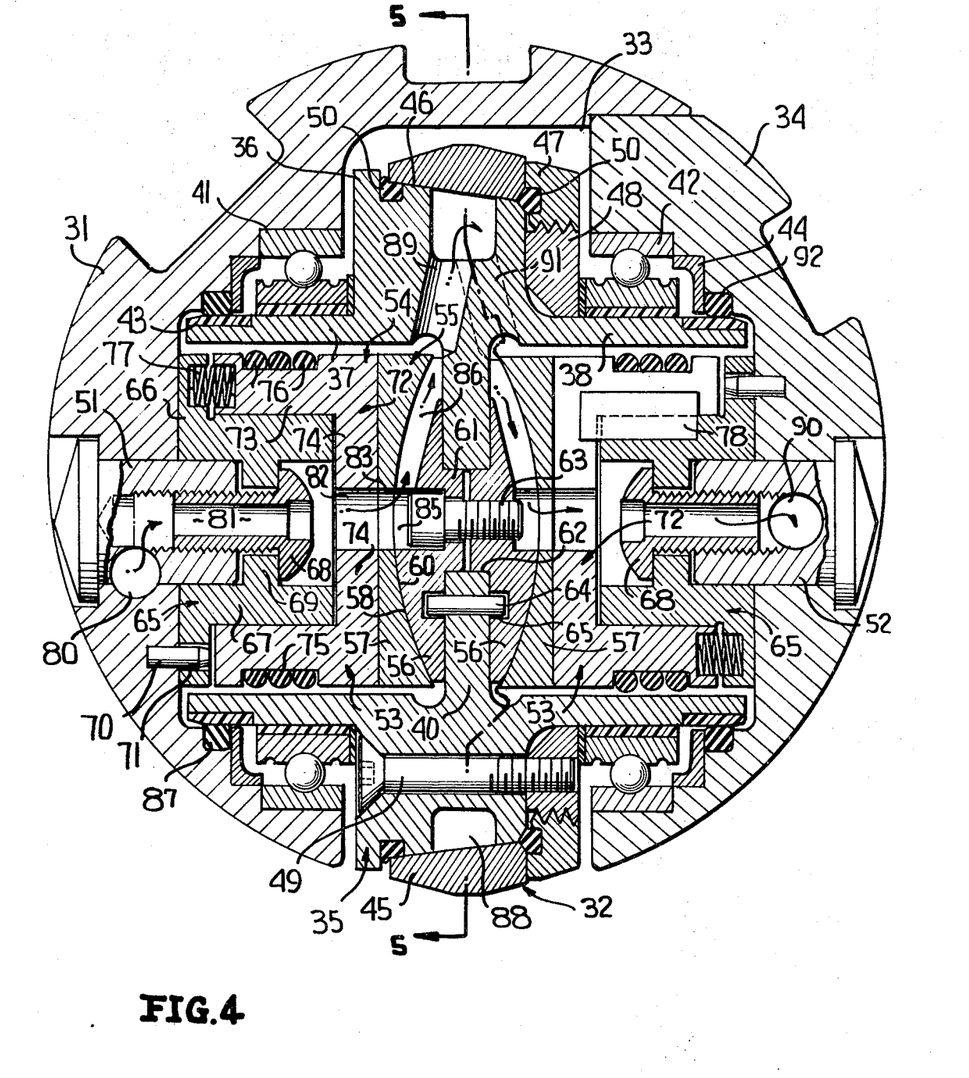
FIG. 4 is an enlarged transverse sectional view taken along the line 4—4 of FIG. 1 and shows the specific construction of the internal roller electrode, the mounting thereof and the associated rotary electrical joint.
Figure 5:
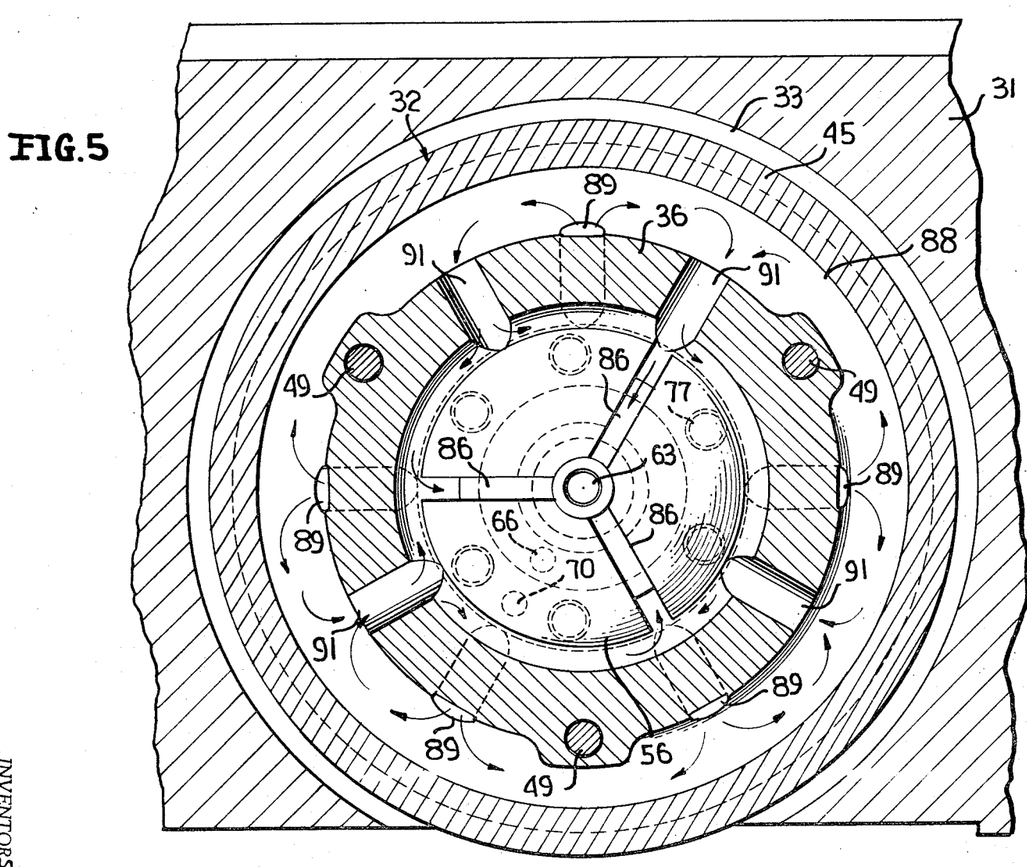
FIG. 5 is an enlarged fragmentary longitudinal sectional view taken along the line 5—5 of FIG. 4 and shows further the details of the roller electrode.

Reference is now made to FIGS. 1, 4 and 5, wherein there is illustrated one form of practical use of the basic rotary electrical joint of FIGS. 2 and 3. In FIGS. 1, 4 and 5 there is illustrated a portion of a welding apparatus for welding tubular members, such as can bodies. This welding apparatus is generally identified by the numeral 30 and includes a horn 31 along which the tubular members pass as they are being welded. The horn 31 has mounted therein an internal roller electrode which is generally identified by the numeral 32. The roller electrode 32 projects slightly below the horn 31 for engagement with the interior of a seam to be welded.

Referring now to FIG. 4 in particular, it will be seen that the horn 31 is hollowed out to receive the roller electrode 32. The hollow space within the horn 31 is generally identified by the numeral 33 and access thereto is obtainable by removing a removable portion 34 of the horn 31. The removable portion 34 extends longitudinally of the horn 31 and is secured in place by means of suitable fasteners (not shown).

The roller electrode 32 includes a body which is identified by the numeral 35. The body 35 includes an annular central portion which projects externally of two integral hollow shaft portions 37 and 38. The body 35 also includes an inwardly projecting central portion 40.

It is to be noted that the shaft portion 37 is rotatably journalled within a bearing 41 carried by the horn 31 while the shaft portion 38 is rotatably journalled within a bearing 42 carried by the removable horn section 34. In order that no electrical current will pass between the horn 31 and the shaft portion 37 through the bearing 41, the bearing 41 is suitably insulated by means of insulating strips 43. The bearing 42 is similarly protected by means of insulating strips 44.

The electrode body 35 is provided with a replaceable electrode rim 45. The rim 45 is wedged onto a frustoconical outer surface portion 46 of the electrode body portion 36 by means of a clamping ring 47. The clamping ring 47 is threadedly engaged with a ring 48 which is removably secured to the body portion 36 by means of suitable fasteners 49. It is to be noted that the rim 45 is sealed with respect to the electrode body 35 at the opposite ends thereof by means of sealing rings 50.

The horn 31 has secured thereto in conducting relation a conductive post 51 which projects into the cavity 33 in opposed relation to a like conductive post 52 carried by the removable horn portion 34. Identical rotary electrical joints, generally identified by the numeral 53 are mounted within the tubular shaft portions 37 and 38 of the electrode body 35 between the conductive posts 51 and 52 and the internally projecting portion 40 of the electrode body. For simplicity, only the rotary electrical joint associated with the conductive post 51 will be described in detail.

The rotary electrical joint 53 is substantially identical to the rotary electrical joint 10. It will be seen that the rotary electrical joint 53 includes a first conductor unit 54 and a second conductor unit 55. The conductor unit 55 is formed of internested conductor members 56 and 57 with the conductor member 56 having a convex face 58 in mating and contacting relation to a concave face 60 of the conductor member 57.

The conductor member 56 is secured to the electrode body 35 by means of an annular projection 61 which extends through a central bore 62 in the inner intermediate portion 40 of the electrode body. A bolt 63 passes through the conductor member 56 of one of the electrical joints 53 and is threaded into the like conductor member 56 of the other of the electrical joints 53. The conductor members 56 are also interlocked with the conductor body 35 by means of a pin 64 carried by the conductor body and received in a socket 65 in the conductor member 56.

The conductor unit 54 includes a holder 65. The holder 65 includes a flanged portion 66 and a sleeve portion 67. The sleeve portion 67 is telescoped over the conductor post 51 and is secured in place by means of a fastener 68 which is threaded into the conductive post 51. The fastener 68 engages an internal annular projection 69 on the sleeve portion 67. The holder 65 is prevented from rotating by a pin 70 carried by the horn 31 and projecting into an opening formed in the flange portion 66.

The conductor unit 54 also includes a plurality of brush segments 72. Normally there will be three brush segments, but the number may be increased if desired. Each brush segment 72 includes an arcuate sleeve-like portion 73 which is internally contoured to closely fit about the sleeve portion 67 of the holder 65. Each brush segment 72 also includes an end flange 74 which is in face-to-face engagement with the conductor member 57.

The brush segments 72 are provided with an external groove 75. One or more elastic bands 76 are positioned within the groove 75 and serve to resiliently clamp the brush segments 72 on the holder 65. These resilient bands 76 may be in the form of conventional O-rings.

It is to be understood that the resilient bands 76, while they hold the brush segments 72 in contact with the holder 65, permit both axial and slight rocking movement of the brush segments 54 relative to the holder 65. In order that each brush segment 72 may be held in face-to-face contact with the conductor member 57, for each of the brush segments 72, there is at least one resilient member 77 disposed between the flange 66 and the adjacent end of the brush segment 72. The resilient members 77 are preferably in the form of coil springs and are seated in opposed pockets in the flange 66 and the sleeve portion 73.

It is also pointed out here that the brush segments 72 are in circumferentially spaced relation. The spacing of the brush segments 72 is assured by means of keys 78 which are carried by the holder 65 and project radially therefrom. This assures a proper centering of the brush segments 72 at all times.

As discussed with respect to the electrical joint 10 of FIGS. 2 and 3, the electrical joints 53 automatically compensate for any eccentricity in the mounting of the electrode body 35 with respect to the conductive pins 51 and 52. Also, the electrical joints 53 automatically compensate for any wobble of the electrode body 35.

It will be readily apparent that electrical energy will be transmitted through the horn 31 in any desired manner to the conductive posts 51 and 52 and then through the electrical joints 53 into the electrode body 35. In addition, the conductive posts 51 and 52 are utilized for the purpose of circulating coolant through the rotary joints 53 and through the electrode body 35.

The horn 31 is provided with a coolant supply passage 80 which opens into the interior of the conductive post 51. The coolant then flows through the conductive post 51 into a bore through the fastener 68 into the sleeve portion 67. The end flanges 74 of the brush segments 72 are shaped to define a bore 82 through which the coolant may axially pass. Certain of the coolant will also circulate radially in between the brush segments 72.

The conductor member 57 is provided with a central bore 83 which is generally aligned with the bore 82 to permit the continued passage of the coolant into a bore 85 formed in the face of the conductor member 56. The face of the conductor member 56 is also provided with circumferentially spaced, radial passages 86. It will thus be apparent that there is a freedom of coolant flow through the electrical joint 53 to the exterior thereof and into the space defined by the shaft portion 37.

Flow of coolant around the remote end of the shaft portion 37 is prevented by an O-ring 87. On the other hand, in order that the rim 45 may be cooled, the intermediate body portion 36 is provided with an annular groove opening against the inner surface of the rim 45 and which groove 88 is in communication with the interior of the shaft portion 37 through a plurality of radial passages 89.

It is to be noted that the removable horn portion 34 has a return passage 90 for the coolant. Coolant flows out of the annular groove 88 through further radial passages 91 formed in the intermediate body portion 36 and opening into the interior of the tubular shaft portion 38. This coolant then passes back through the electrical joint 53 associated with the conductive post 52 in an opposite manner from that described with respect to the conductor joint 53 associated with the conductive post 51 and out through the coolant outlet passage 90. It is to be noted that the tubular shaft portion 38 is sealed relative to the removable horn portion 34 by means of an O-ring 92.

Figure 6:
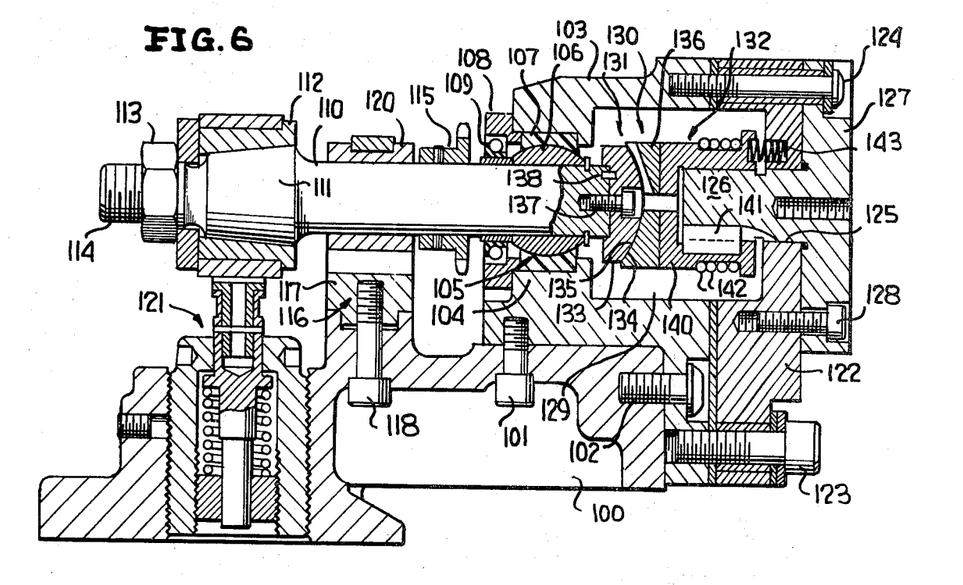
FIG. 6 is a longitudinal sectional view taken through a tack welder electrode and shows both the specific mounting of the electrode and the rotary electrical joint for supplying electrical energy thereto.

Reference is now made to FIG. 6 wherein there is illustrated the details of an electrode construction for a tack welder. This construction includes a base 100 which is suitably mounted in a manner which in of itself forms no part of this invention. Base 100 has mounted thereon by means of suitable fasteners 101 and 102 a support in the form of a housing 103. The housing 103 includes an end wall 104 in which there is positioned a ball bushing assembly 105. The ball bushing assembly 105 includes a ball number 106 and a bushing 107. For reasons to be described in more detail hereinafter, the bushing 107 may be formed of an insulating material having suitable bearing forming characteristics, such as Teflon.

The ball bushing 105 is retained within the end wall 104 by means of a retaining ring 108. The retaining ring 108, in turn, supports a seal 109.

A shaft 110 is mounted relative to the housing 103 by means of the ball bushing 105. It is to be noted that the shaft 110 is carried by the ball 106 with the inner end thereof projecting only slightly into the housing 103. The opposite end of the shaft 110 extends a considerably distance from the housing 103 and includes an enlarged end portion 111 which is tapered and which has mounted thereon an electrode 112. The electrode 112 is retained in place by a nut 113 which is threaded on a threaded end portion of reduced diameter of the shaft 110.

It is to be noted that the shaft 110 is mounted for both rotary movement and for limited vertical rocking movement. In order that the shaft 110 may be periodically rotated, there is mounted thereon a sprocket 115 which is driven in any desired manner.

The base 100 has mounted thereon in spaced relation to the housing 103 a guide assembly 116. The guide assembly 116 includes a frame member 117 which is interlocked with the base 100 and secured in place by means of a fastener 118. The frame member 117 has mounted therein a guide bushing 120 which permits vertical movement only of the shaft 110. The guide member 120 is also preferably formed of an insulating material having suitable bearing characteristics.

The base 100 also includes a resilient support assembly 121 which engages the underside of the electrode 112 and resiliently resists downward movement of the electrode 112. However, limited downward movement of the electrode 112 is desired in order to assure proper pressure contact of the electrode 112 with a workpiece.

It is to be understood that electrical energy must be supplied to the electrode 112 through the shaft 110. In order to accomplish this, the housing 103 is provided with a rear plate 122 which is removable and which is secured to the housing 103 in insulated relation relative thereto by means of suitable fasteners 123 and 124.

The rear plate 122 has a bore 125 therethrough generally in axial alignment with the shaft 110. The bore 125 has seated therein a conductive post 126 which is carried by a mounting flange 127. The mounting flange 127 is secured to the rear plate 122 both by the fasteners 124 and fasteners 128. The plate 127 is adapted to have secured thereto in direct contact therewith a suitable lead for supplying electrical energy to the shaft 110.

It is to be noted that the housing 103 and the plate 122 define a chamber 129. The chamber 129 has positioned therein a rotary electrical joint, which is generally identified by the numeral 130. The rotary electrical joint 130 incorporates the principle of the electrical joint 10 and is disposed between the shaft 110 and the conductive post 126.

The rotary electrical joint 130 includes a conductor unit 131 and a conductor unit 132 which are disposed in face-to-face contact in a plane normal to the axis of the shaft 110 and which are in sliding contact in that plane so as to compensate for any eccentricity between the axis of the shaft 110 with respect to the axis of the conductive post 126.

The electrical joint 130 also compensates for the rocking action of the shaft 110 due to the fact that the conductor unit 131 includes a conductor member 133 having a convex face 134 disposed in nested contacting engagement with a concave face 135 of a conductor member 136. The conductor member 133 is secured to the shaft 110 by means of a threaded fastener 137 and a pin 138 while the conductor member 136 freely floats between the conductor member 133 and the conductor unit 132.

It is to be noted that the conductor unit 132 is formed of a plurality of brush segments 140 which are in face-to-face contact with the conductor member 136 while being mounted on the conductive post 126 for both axial sliding movement and slight rocking movement. The brush segments 140 are retained in circumferentially spaced relation by means of keys 141 projecting radially from the conductive post 126 and are clamped on the post 126 by means of a plurality of resilient bands 142. The brush segments 132 are individually urged into contact with the conductor member 136 by springs 143 which extend between the plate 122 and the respective brush segment 132.

Figure 7:
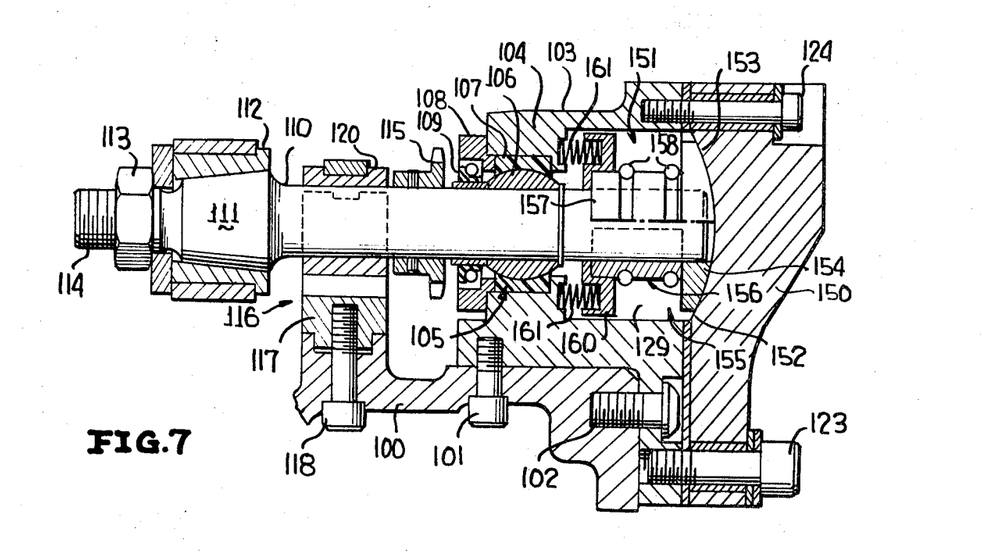
FIG. 7 is a longitudinal sectional view similar to FIG. 6 through a modified form of mounting and electrical joint for a tack welder electrode.

Reference is now made to FIG. 7 wherein it will be seen that the shaft 110 for the roller electrode 112 has a modified form of electrical joint for supplying electrical energy thereto. The cover 122 of FIG. 6 has been replaced by a cover 150. It is intended that the usual electrical lead (not shown) be coupled directly to the cover 150. It is also pointed out here that the shaft 110 of FIG. 7 is extended as compared to the like shaft of FIG. 6 so that the inner end thereof terminates adjacent the cover 150. An electrical joint, which is generally identified by the numeral 151 couples the cover 150 to the shaft 110 with the cover 150 forming a part of the electrical joint 151.

It is to be noted that the cover 150 has an inner surface 152 of a concave configuration opposing the shaft 110. Furthermore, the surface 152 is preferably of a diameter equal to the distance between the surface 152 and the center of the ball bushing 105. The surface 152 has in face-to-face contact therewith a convex surface 153 of an electrode member 154. It is to be understood that the electrode member 154, together with the cover 150, form a conductor unit which is generally identified by the numeral 155.

The electrical joint 151 also includes a conductor unit which is generally identified by the numeral 156. The conductor unit 156 includes a plurality of brush segments 157 which are mounted on the shaft 110 immediately adjacent the conductor element 154 and have ends thereof in face-to-face contact with the conductor element 154. The brush segments 157, which are preferably disposed in circumferentially spaced relation about the shaft 110, are clamped on the shaft 110 by means of resilient bands 158 which may be in the form of O-rings. The resilient bands 158 permit both axial shifting of the brush segments 157 and slight rocking thereof relative to the shaft 110, as is required. If desired, the shaft 110 may be provided with suitable keys for retaining the brush segments 157 in circumferentially spaced relation.

The brush segments 157 are engaged by a collar 160 which, in turn, is resiliently urged towards the cover 150 by a plurality of springs 161 which abut the end wall 104 of the housing 103. The springs 161 serve to retain the brush segments 157 in face-to-face contact with the conductor member 154.

It is also pointed out that the conductor member 154 is carried by the shaft 110 and is generally movable therewith although the fit between the shaft 110 and the conductor member 154 need not necessarily be a tight connection. Thus, there may be relative sliding movement between the brush segments 157 and the conductor member 154 in the plane of contact thereof, which plane is substantially normal to the axis of the shaft 110.

It will be readily apparent that the interfit between the conductor member 154 and the cover 150 serves to compensate for any wobble or rocking of the shaft 110. Therefore, the electrical joint 151 permits rotation of the shaft 110 relative to the cover 150 and at the same time compensates for any axial misalignment and rocking of the shaft 110.

Figure 8:
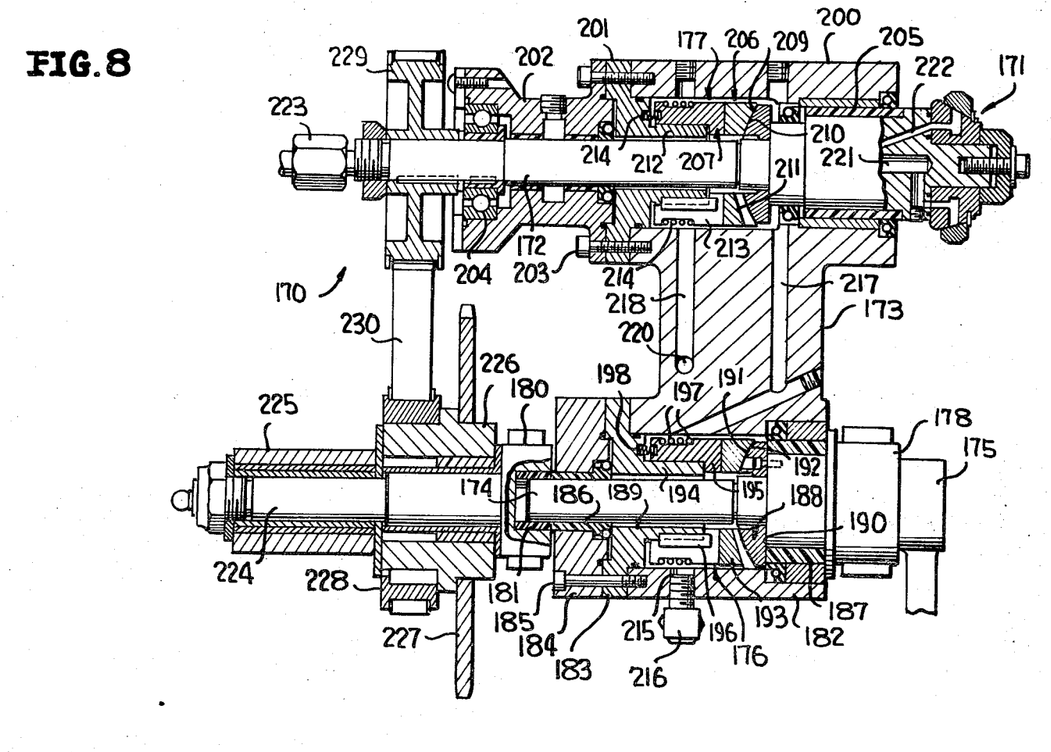
FIG. 8 is a longitudinal sectional view taken through an external roller electrode and the mounting therefor including the specific means for supplying electrical energy thereto through two rotary electrical joints.

Reference is now made to FIG. 8 wherein there is illustrated the general details of an external seam electrode assembly, which assembly is identified by the numeral 170. Basically, the assembly 170 includes a roller electrode 171 which is mounted for rotation on the end of a shaft 172. The shaft 172 is carried by a support arm 173 which is mounted on a pivot shaft 174. Electrical energy is supplied to the pivot shaft 174 through a stationary electrical lead 175 and is transmitted to the support arm 173 through an electrical joint, which is generally identified by the numeral 176. An identical electrical joint 177 transmits electrical energy from the support arm 173 to the shaft 172.

The pivot shaft 174 is carried by a primary support 178 and a secondary support 180. If desired, the pivot shaft 174 may be insulated relative to the supports 178 and 180, such as by means of the bushing 181 mounting the left end of the pivot shaft 174.

The support arm 173 includes a tubular end portion 182 which is provided at the left end thereof with an adapter 183 and an end plate 184 which are secured in place by means of suitable fasteners 185. The support arm 173 is journalled on the pivot shaft 174 by means of a suitable bearing 186 carried by the end plate, and a bearing 187 directly supported by the end portion 182.

Although no attempts have been made to specifically illustrate insulaton, it is to be understood that it is preferred that the bearings 186 and 187 be insulated so that there will be no current flow from the pivot shaft 174 through the bearings 186 and 187 to the support arm 173.

The electrical joint 176 includes a first conductor unit 188 and a second conductor unit 189. The conductor unit 188 is carried by the pivot shaft 174 and includes a conductor member 190 which is fixedly secured to the pivot shaft 174. The conductor member 190 has a convex surface 191 which is in face-to-face mating contact with a concave face 192 of a conductor member 193. It is to be noted that the conductor member 193 is mounted in floating relation between the conductor member 190 and the conductor unit 189.

The conductor unit 189 includes a tubular conductive post 194 which is integrally formed with the adapter 183 and through which electrical energy is delivered into the support arm 173. The conductor unit 189 also includes a plurality of brush segments 195 which are mounted on the conductive post 194 and which are maintained in circumferentially spaced relation by means of keys 196 carried by the conductive post 194. The brush segments 195 are resiliently clamped to the conductor post 194 by means of a plurality of resilient bands 197 which encircle the brush segments 195. The resilient bands 197 may be in the form of simple O-rings.

It is to be understood that the brush segments 195 are free to move axially of the conductive post 194 and to rock slightly relative thereto. In order to assure that the brush segments 195 remain in face-to-face sliding contact with the conductor member 193 at all times, springs 198 are positioned between the adapter 183 and the individual brush segments 195.

It will be readily apparent that due to the provision of the sliding face-to-face contact between the brush segments 195 and the conductor member 193 in a plane normal to the axis of the pivot shaft 174, compensation is automatically provided for any eccentricity between the axis of the end portion 182 and the axis of the pivot shaft 174. Also because of the concavo-convex relationship between the contacting surfaces of the conductor members 190 and 193, any rocking or wobble of the support arm end portion 82 relative to the pivot shaft 174 is automatically compensated for.

The end of the support arm 173 opposite from the tubular end portion 182 is also in the form of a tubular end portion, this end portion being identified by the numeral 200. The end portion 200 is provided with an adapter 201, which is identical with the adapter 183. It is further provided with a second adapter 202. The adapters 201 and 202 are secured to the tubular end portion 200 by means of suitable fasteners 203.

It will be seen that the rotating shaft 172 is supported for rotation by a bearing 204 mounted in the adapter 202 and a bearing 205 carried by the opposite end of the tubular end portion 200. If desired, suitable insulation may be provided to prevent current flow from the support arm 173 through the bearing 204 and 205 into the shaft 172.

The electrical joint 177 includes a conductor unit 206 and a conductor unit 207. The conductor unit 206 includes a conductor member 208 which is secured to the shaft 172 for rotation therewith. The conductor member 208 has a convex face 209 which is in constant face-to-face contact with a concave face 210 of a conductor member 211. The conductor member 211 encircles the shaft 172 and is floatingly mounted between the conductor member 208 and the conductor member 207.

The conductor member 207 includes a conductive post 212 which is integrally formed with the adapted 201 and through which electrical energy is delivered into the electrical joint 177. The conductive post 212 has mounted thereon a plurality of brush segments 213 which are resiliently clamped in place by a plurality of resilient bands 214 which may be in the form of conventional O-rings. The resilient bands 214 prevent limited axial movement and rocking movement of the brush segments 207 relative to the conductive post 212.

It will be seen that the brush segments 213 are in face-to-face contact with the conductor member 211 in a plane normal to the axis of the shaft 172. This relationship compensates for any eccentricity between the axis of the shaft 172 and the axis of the tubular end portion 200. In order that the desired pressure contact between the brush segments 213 and the conductor member 211 may be maintained, springs 214 are positioned between the adapter 201 and respective ones of the brush segments 207.

It is also to be understood that the concavo-convex relationship between the conductor members 208 and 211 compensate for any wobble or rocking of the shaft 172 relative to the support arm 173.

It is to be understood that it is preferred that a coolant be supplied to the electrical joints 176 and 177. Accordingly, the support arm 173 is provided with suitable passages for facilitating the circulation of such coolant. These passages include an inlet passage 215 in the tubular end portion 182 opening into the interior thereof. An inlet line 216 is connected to the inlet passage 215. Coolant flows around and through the electrical joint 176 and then through a passage 217 into the interior of the tubular end portion 200. After the coolant circulates about the electrical joint 177, it returns to a discharge passage 218 and out through a discharge outlet 220.

It is to be noted that the end portions 182 and 200 of the support arm 173 are provided with suitable seals to prevent the escape of coolant and the flow of coolant into undesired portions of the assembly 170.

It is also to be noted that the shaft 172 has suitable coolant passages 221 and 222 formed therein for supplying coolant to the electrode 171. Coolant flow into and out of the shaft 172 is effected by means of a fitting 223 secured to the left end of the shaft 172. The fitting 223 is part of a conventional rotary joint for liquids and no further description is believed to be necessary.

It is to be understood that in the use of the roller electrode 171, it is necessary that the electrode 171 be free to float with respect to a workpiece being welded. Accordingly, during the normal use of the electrode assembly 170, the support arm 172 pivots about the pivot shaft 174, which pivot shaft, as previously described, is fixed. In addition to supporting the shaft 172 for rotation and for pivoting about the pivot shaft 174, it is necessary to drive the shaft 172.

The means for driving the shaft 172 includes a stub shaft 224 which is in part carried by the support 180 and in part by a support 225. The stub shaft has mounted thereon for rotation intermediate the supports 180 and 225 a hub 226. The hub 226 carries a sprocket 227 which is suitably driven to drive the hub 226. The hub 226 also carries a pulley 228 which is aligned with a like pulley 229 carried by the shaft 172. A belt 230 connects together the two pulleys 228 and 229 to drive the shaft 172.

Although all of the specific details of the various electrode assemblies utilizing the rotary electrical joints of this invention have not been specifically illustrated and described, it is believed that sufficient details thereof have been illustrated and described to fully understand the operation of the electrode assemblies, particularly the utilization of the rotary electrical joints in conjunction therewith. Accordingly, amplification of the structures of the electrode assemblies is believed to be unnecessary.

Although only preferred embodiments of the rotary electrical joint have been specifically illustrated and described, it is to be understood that minor variations may be made in these electrical joints without departing from the spirit of the invention.

We claim:

1. A rotary electrical joint comprising a support, a rotatable member mounted in said support for rotation relative thereto, and an electrical connection between said rotatable member and said support comprising first and second conductor units, one of said conductor units being carried by said support and the other of said conductor units being carried by said rotatable member for rotation therewith, said first conductor unit being in face-to-face contact with said second conductor unit along a plane disposed substantially normal to the axis of rotation of said rotatable member with said conductor units having sliding contact in said plane to compensate for eccentricity in the mounting of said conductor units.

2. The rotary electrical joint of claim 1 wherein said first conductor unit includes first and second conductor members having slidable contacting concavo-convex surfaces for compensating for wobble of said rotatable member.

3. The rotary electrical joint of claim 1 wherein said first conductor unit includes first and second conductor members having slidable contacting concavo-convex surfaces for compensating for wobble of said rotatable member, one of said conductor members of said first conductor unit being floatingly positioned between the other of said conductor members of said first conductor unit and said second conductor unit.

4. The rotary electrical joint of claim 1 wherein said second conductor unit includes a plurality of separate circumferentially arranged brushes each mounted for individual axial movement to maintain contact with said first conductor unit in all positions thereof.

5. The rotary electrical joint of claim 1 wherein said second conductor unit includes a plurality of separate circumferentially arranged brushes each mounted for individual axial movement to maintain contact with said first conductor unit in all positions thereof, and resilient means axially urging said brushes towards said first conductor unit.

6. The rotary electrical joint of claim 1 wherein said second conductor unit includes a plurality of separate circumferentially arranged brushes each mounted for individual axial movement to maintain contact with said first conductor unit in all positions thereof, and resilient means engaging said brushes and releasably maintaining the circumferential relation of said brushes while permitting a relative tilting thereof to compensate for wobble of said rotatable member.

7. The rotary electrical joint of claim 1 wherein said second conductor unit includes a plurality of separate circumferentially arranged brushes each mounted for individual axial movement to maintain contact with said first conductor unit in all positions thereof, and resilient means axially individually urging said brushes towards said first conductor unit.

8. The rotary electrical joint of claim 1 wherein there are two sets of said first and second conductor units, and said rotatable member is disposed therebetween.

9. The rotary electrical joint of claim 1 wherein said rotatable member includes a shaft mounted in said support for rocking and rotary movement, said support includes a conductive post opposing an inner end of said shaft, and said conductor units are disposed between the end of said shaft and said conductive post.

10. The rotary electrical joint of claim 9 wherein first conductor unit is carried by said shaft and includes first and second conductor members having slidable contacting concavo-convex surfaces for compensating for the rocking of said shaft.

11. The rotary electrical joint of claim 1 wherein said rotatable member includes a shaft mounted in said support for rocking and rotary movement, said support includes a conductive post opposing an inner end of said shaft, said first conductor unit including first and second conductor members having slidable contacting concavo-convex surfaces for compensating for the rocking of said shaft, and said conductive part forming one of the conductor members of said first conductor unit.

12. The rotary electrical joint of claim 11 wherein the other of said conductor members of said first conductor unit is positioned on the end of said shaft for movement generally with said shaft.

13. The rotary electrical joint of claim 11 wherein said second conductor unit includes a plurality of brush segments directly mounted on said shaft with a resilient band clamping said brush segments to said shaft for limited axial and rocking movement.

14. The rotary electrical joint of claim 1 wherein said second conductor unit includes a plurality of separate circumferentially arranged brushes each mounted on a pin-like support for individual axial movement to maintain contact with said first conductor unit in all positions thereof.

15. The rotary electrical joint of claim 14 wherein said pin-like support is a shaft portion of said rotatable member.

16. The rotary electrical joint of claim 14 wherein said pin-like support is a shaft portion of said rotatable member, and said first conductor unit includes first and second conductor members having slidable contacting concavo-convex surfaces for compensating for wobble of said rotatable member.

17. The rotary electrical joint of claim 14 wherein said pin-like support is a shaft portion of said rotatable member, and said first conductor unit includes first and second conductor members having slidable contacting concavo-convex surfaces for compensating for wobble of said rotatable member, one of said conductor members of said first conductor unit being mounted on said shaft portion.

18. The rotary electrical joint of claim 14 wherein said pin-like support is a shaft portion of said rotatable member, and said first conductor unit includes first and second conductor members having slidable contacting concavo-convex surfaces for compensating for wobble of said rotatable member, one of said conductor members of said first conductor unit being mounted on said shaft portion, and the other of said conductor members of said first conductor unit being a part of said support.

19. The rotary electrical joint of claim 14 wherein said pin-like support is fixedly mounted in substantially coaxial relation with respect to said rotatable member.

20. The rotary electrical joint of claim 14 wherein said pin-like support is fixedly mounted in substantially coaxial relation with respect to said rotatable member, and generally opposes said rotatable member.

21. The rotary electrical joint of claim 14 wherein said pin-like support is fixedly mounted in substantially coaxial relation with respect to said rotatable member, and is concentric to the axis of said rotatable member.

22. The rotary electrical joint of claim 14 wherein said brushes are retained on said pin-like support by resilient bands which allow both said axial movement and slight rocking movement of said brushes on said pin-like support.

23. A rotary electrical joint comprising a support, a rotatable member, means carried by said support supporting said rotatable member for rotary movement, first conductor units carried by said rotatable member on opposite sides thereof, second conductor units carried by said support on opposite sides of said rotatable member in opposed relation to said first conductor units, and resilient means urging said first and second conductor units into face-to-face contact along planes substantially normal to the axis of rotation of said rotatable members with said first and second conductor units having slidable contact in said planes to compensate for eccentricity in the mounting of said first and second conductor units.

24. The rotary electrical joint of claim 23 wherein each second conductive unit is mounted on a fixed conductive post, said posts being mounted substantially in alignment and coaxially with said rotatable member, each second conductive member including a holder carried by a respective one of said posts, and a plurality of brush segments mounted on said holder, said holder including a sleeve portion and a flange portion, said brush segments being mounted on said sleeve portion for both sliding and rocking movements, at least on resilient band surrounding said brush elements and clamping said brush elements on said sleeve portion, and said resilient means being disposed between said flange portion and said brush elements.

25. The rotary electrical joint of claim 23 wherein said second conductor units are each formed of a plurality of brush segments mounted on a fixed conductive post for limited rocking movement.

26. The rotary electrical joint of claim 23 wherein said second conductor units are each formed of a plurality of brush segments mounted on a fixed conductive post for individual sliding movement thereon, and said resilient means being directly operative on each of said segments.

27. The rotary electrical joint of claim 23 wherein said second conductor units are each formed of a plurality of brush segments mounted on a fixed conductive post, circumferential resilient clamping means clamping said brush segments on said post for limited individual movement relative to said post, and said first mentioned resilient means being directly operative on each of said segments axially of said post.

28. The rotary electrical joint of claim 23 wherein each said first conductor unit includes inner and outer conductor elements, one conductor element of each first conductor unit being secured to said rotatable member, and the other conductor element of each first conductor unit being disposed between the respective one conductor element and said second conductor unit, and said conductor elements of each first conductor unit having relative slidable contacting concavo-convex surfaces for compensating for wobble of said rotatable member.

29. The rotary electrical joint of claim 23 wherein said second conductor units are each formed of a plurality of brush segments mounted on a fixed conductive post for limited rocking movement, said conductive posts forming coolant inlet and outlet, and said first and second conductor means have coolant passages therethrough.

30. The rotary electrical joint of claim 29 wherein said rotatable member forms an intermediate divider between said conductive posts, and said rotatable member has flow passges therethrough controlling the flow of coolant between said inlet and said outlet.

31. The rotary electrical joint of claim 29 wherein said rotatable member forms an intermediate divider between said conductive posts, and said rotatable member has flow passages therethrough controlling the flow of coolant between said inlet and said outlet, said rotatable member being a roller electrode having a rim, and said flow passages directing coolant flow into contact with said rim.

32. A rotary electrical joint assembly comprising a fixed suport, a pivot shaft carried by said fixed support, a movable support carried by said pivot shaft, a rotatable shaft carried by said movable support, means on said rotatable shaft for mounting an electrode, an electrical conductor rigidly secured to said pivot shaft, a first rotary electrical joint between said pivot shaft and said movable support with said movable support forming a conductor, and a second rotary electrical joint between said movable support and said rotatable shaft.

33. The rotary electrical joint assembly of claim 32 wherein said movable support and said rotary electrical joints have coolant passages therethrough, and common coolant supply means for said rotary electrical joints connected to said movable supports.

34. The rotary electrical joint assembly of claim 32 wherein each of said rotary electrical joints includes first and second conductor units, one of said conductor units being carried by the respective shaft for rotation therewith and the other of said conductor units being carried by said movable support, said first conductor unit being in face-to-face contact with said second conductor unit along a plane disposed substantially normal to the axis of the respective shaft with said conductor units having sliding contact in said plane to compensate for eccentricity in the mounting of said conductor units.

35. The rotary electrical joint assembly of claim 34 wherein said first conductor unit includes first and second conductor members having slidable contacting concavo-convex surfaces for compensating for wobble of the respective shaft.

36. The rotary electrical joint assembly of claim 34 wherein said first conductor unit includes first and second conductor members having slidable contacting concavo-convex surfaces for compensating for wobble of the respective shaft, one of said conductor members of said first conductor unit being floatingly positioned between the other of said conductor members of said first conductor unit and said second conductor unit.

References Cited
UNITED STATES PATENTS

| | | | |
|---|---|---|---|
| 575,615 | 1/1897 | Osyor | 339—7 X |
| 3,400,357 | 9/1968 | Cary et al. | 339—8 |

ERNEST R. PURSER, Primary Examiner

U.S. Cl. X.R.

339—5